US009238587B2

(12) United States Patent
Mason

(10) Patent No.: US 9,238,587 B2
(45) Date of Patent: Jan. 19, 2016

(54) METHOD AND SYSTEM FOR THE TREATMENT OF WATER AND FLUIDS WITH CHLORINE DIOXIDE

(71) Applicant: SABRE INTELLECTUAL PROPERTY HOLDINGS LLC, Slingerlands, NY (US)

(72) Inventor: John Y. Mason, Odessa, TX (US)

(73) Assignee: Sabre Intellectual Property Holdings LLC, Slingerlands, NY (US)

( * ) Notice: Subject to any disclaimer, the term of this patent is extended or adjusted under 35 U.S.C. 154(b) by 0 days.

(21) Appl. No.: 13/837,936

(22) Filed: Mar. 15, 2013

(65) Prior Publication Data

US 2014/0263088 A1    Sep. 18, 2014

(51) Int. Cl.
| C02F 1/74 | (2006.01) |
| C02F 1/76 | (2006.01) |
| C02F 1/72 | (2006.01) |
| C02F 1/78 | (2006.01) |
| C02F 103/06 | (2006.01) |
| C02F 103/10 | (2006.01) |
| C02F 103/16 | (2006.01) |

(52) U.S. Cl.
CPC . *C02F 1/76* (2013.01); *C02F 1/727* (2013.01); *C02F 1/763* (2013.01); *C02F 1/74* (2013.01); *C02F 1/78* (2013.01); *C02F 2103/06* (2013.01); *C02F 2103/10* (2013.01); *C02F 2103/16* (2013.01)

(58) Field of Classification Search
CPC .............. C02F 1/727; C02F 1/74; C02F 1/76; C02F 1/763; C02F 1/78; C02F 2103/16; C02F 2103/06; C02F 2103/10; C02F 2101/101; C02F 2101/40
USPC .......................... 210/754, 756, 758, 760, 764
See application file for complete search history.

(56) References Cited

U.S. PATENT DOCUMENTS

| 4,310,425 A | 1/1982 | Key et al. |
| 4,473,115 A | 9/1984 | Oakes |
| 4,482,459 A | 11/1984 | Shiver |
| 4,945,992 A | 8/1990 | Sacco |
| 4,964,466 A | 10/1990 | Williams et al. |
| 5,016,714 A | 5/1991 | McCabe et al. |
| 5,018,578 A | 5/1991 | El Rabbaa et al. |
| 5,031,700 A | 7/1991 | McDougall et al. |
| 6,551,518 B2 * | 4/2003 | Gargas .......................... 210/754 |
| 6,645,457 B2 * | 11/2003 | Mason et al. ................. 423/477 |
| 6,711,830 B2 | 3/2004 | Hensley et al. |
| 6,981,549 B2 | 1/2006 | Morales et al. |
| 7,131,495 B2 | 11/2006 | Hao et al. |
| 7,514,005 B2 | 4/2009 | Browne et al. |
| 7,578,968 B1 | 8/2009 | Nalepa et al. |
| 7,615,518 B2 | 11/2009 | Perry et al. |
| 7,678,280 B2 | 3/2010 | Mueller |
| 7,712,534 B2 | 5/2010 | Bryant et al. |
| 7,867,399 B2 | 1/2011 | Jones et al. |
| 7,878,248 B2 | 2/2011 | Abad et al. |
| 7,897,063 B1 | 3/2011 | Perry et al. |
| 7,935,261 B2 | 5/2011 | Jones et al. |
| 7,955,419 B2 | 6/2011 | Casella |
| 7,964,101 B2 | 6/2011 | Slough et al. |
| 8,083,935 B2 | 12/2011 | Eia |
| 2001/0007314 A1 | 7/2001 | Sherman |
| 2002/0125196 A1 | 9/2002 | Rosenblatt et al. |
| 2003/0203827 A1 | 10/2003 | Cooper et al. |
| 2004/0200779 A1 | 10/2004 | Newkirk et al. |
| 2004/0224855 A1 | 11/2004 | Hao et al. |
| 2006/0096930 A1 * | 5/2006 | Beardwood ................... 210/754 |
| 2007/0102359 A1 * | 5/2007 | Lombardi et al. ............ 210/639 |
| 2007/0116637 A1 | 5/2007 | Woodruff et al. |
| 2007/0295936 A1 | 12/2007 | Byrne et al. |
| 2008/0003507 A1 | 1/2008 | Nanjundiah |
| 2009/0062156 A1 | 3/2009 | Wilson et al. |
| 2009/0229827 A1 | 9/2009 | Bryant et al. |
| 2010/0059226 A1 | 3/2010 | Termine et al. |
| 2010/0190666 A1 | 7/2010 | Ali et al. |
| 2011/0005969 A1 | 1/2011 | Giffin |
| 2011/0132815 A1 | 6/2011 | Angelilli et al. |
| 2011/0137465 A1 | 6/2011 | Angelilli et al. |
| 2011/0220587 A1 | 9/2011 | Duve |
| 2011/0233136 A1 | 9/2011 | Enos et al. |
| 2011/0236961 A1 | 9/2011 | Casella |
| 2013/0009092 A1 | 1/2013 | Ziegler |

FOREIGN PATENT DOCUMENTS

| CA | 1207269 | 7/1986 |
| GB | 2170220 A | 7/1986 |
| WO | 8501722 A1 | 4/1985 |

OTHER PUBLICATIONS

Kimball, Robert. "Key Considerations for Frac Flowbacic/Produced Water Reuse and Treatment." NJWEA Annual Conference. NJ, Atlantic City. May 2012. Lecture. (http://www.aaee.net/DownloadCenter/2012NJWEAPresentation-RobertKimball.pdf).
Kimball, Bob. "Key Considerations for Frac Flowback/Produced Water Reuse and Treatment." NJWEA Annual Conference. NJ, Atlantic City. May 9-13, 2011. Lecture. (http://www.aaee.net/DownloadCenter/Presentation-BobKimball.pdf).
International Search Report and Written Opinion issued in PCT/US2014/030654, mailed Jul. 10, 2014.

* cited by examiner

*Primary Examiner* — Lucas Stelling
(74) *Attorney, Agent, or Firm* — Heslin Rothenberg Farley & Mesiti P.C.

(57) ABSTRACT

Embodiments of the invention relate generally to methods and systems for treating aqueous systems associated with industrial wastewater applications and gas and crude oil drilling, pumping and production to reduce or eliminate contamination. In one embodiment, a method includes: an aqueous volume having an initial oxidant demand, an oxygen-containing oxidant and at least one chlorine oxide at substoichiometric amounts in an amount sufficient to eliminate the oxidant demand. The system includes: an aqueous treatment system comprising a containment system; at least one apparatus for introducing an oxygen-containing oxidant; and at least one apparatus for introducing at least one chlorine oxide into said containment system at controlled, substoichiometric quantities.

26 Claims, No Drawings

METHOD AND SYSTEM FOR THE TREATMENT OF WATER AND FLUIDS WITH CHLORINE DIOXIDE

FIELD OF THE INVENTION

The recited claims relate generally to methods and systems for treating aqueous systems associated with industrial wastewater applications and gas and crude oil drilling, pumping and production, including but not limited to hydraulic fracturing. More particularly, the recited claims relate to an improved method and system of treating contaminated fracturing fluids, produced water, flowback water, source water or other industrial aqueous fluids to reduce or eliminate contamination.

INTRODUCTION

Wastewater associated with hydraulic fracturing and the production of crude oil, i.e. oilfield water, generally consists of two primary sources: flow-back water and produced water. The reuse of these waters is typically difficult due to high contaminant and bacterial loading. More specifically, oilfield water and fracturing fluids (or frac water) can be contaminated with, for example, bacteria, naturally-occurring organics in the formation, organic treatment chemicals (such as viscosifiers, emulsion stabilizers, etc), and production chemicals (such as scale reducers, friction reducers, anti-corrosive chemicals, pH modifiers, etc.), and/or other contaminants that result in a high percentage of TDS. The presence of these contaminants can interfere with later re-use of the water, storage and/or disposal (e.g. injection into disposal wells or sent to municipal treatment facilities).

For example, municipal treatment facilities are facing increasing regulatory requirements for wastewater associated with hydraulic fracturing and satisfying these requirements is costly. Similarly, to the extent contaminated frac and oilfield waters are stored in oilfield pits, open pools, or lagoons, high residual polymer levels and solids loading within the pits can contribute to high hydrogen sulfide production, causing safety and environmental concerns.

More recently, producers are shifting to closed loop systems as the preferred method of handling flowback and produced waters (i.e. reusing these waters in subsequent operations). As such, the water used for hydraulic fracturing operations is often a combination of produced and/or flowback water, surface water and/or municipal water (also known as "commingled water"). Successful pre-treatment of the contaminated water in the storage pits and tanks allows commingled water to be made up of a larger percentage of flowback water and other frac fluids than it would otherwise, and in turn, provide for reduced disposal costs, fresh water costs, and lower water use concerns. Thus, the methods and system disclosed herein will help to reduce and/or effectively eliminate bacteria-contaminated and/or organic chemicals in order to ultimately reduce the water footprint associated with hydraulic fracturing and crude oil production, as well as other industrial wastewater applications.

Various methods and systems for the treatment of oilfield and frac wastewater and source water have been explored and are known in the art. One of the methods includes the use of chlorine dioxide for the treatment of pits, lagoons and tanks storing oilfield waters and fracturing fluids. Chlorine dioxide's unique chemical and physical properties make it ideal for use in treatment of fracturing fluids. As an oxidant, it is able to penetrate hydrocarbons and break emulsions allowing for the separation and recovery of hydrocarbons, as well as the reduction and/or elimination of biological contamination. Because of its specificity, its oxidation power can be directed at contaminates such as sulfides and residual polymers without creation of undesirable by-products and, unlike bleach or chlorine, chlorine dioxide does not form chlorination by-products that can cause operational or environmental concerns.

Chlorine dioxide (and/or chlorite), however, is heavily regulated and caution is necessary in its generation, handling and storage. Furthermore, it can be very costly depending on the chlorine dioxide demand of the wastewater and/or source water. The various embodiments of the invention use the oxidative power of chlorine dioxide together with oxygen (or air) to achieve an unexpected increase in efficiency and capacity for treatment for these waters, thereby substantially lowering the amount of chlorine dioxide required to substoichiometric amounts. In addition, and according to some of the various embodiments of the invention, a combination of chlorine dioxide disinfection and oxygenation is used to provide a faster-acting treatment for wastewater. Such methods and systems result in increased chlorine dioxide capacity and increased efficiency in relation to volumes of water treated, which provides for reduced chemical usage, reduced energy, and reduced effluent, which in turn results in a reduced burden on the environment and reduced cost.

In accordance with one or more of these embodiments, the use of chlorine dioxide to treat pits, lagoons and tanks storing fracturing fluids and oilfield wastewater has the potential to provide reduced treatment costs, fluid disposal costs and make-up water purchases (by allowing for greater reuse of the oilfield wastewater), and reduced environmental and safety concerns. Chlorine dioxide can also be used for the pretreatment and disinfection of fracturing fluids prior to their use in crude oil production and/or hydraulic fracturing operations, including but not limited to surface water, produced water, municipal water, flowback water, or any combination thereof.

Accordingly, it is desirable to provide methods and systems for the treatment of wastewater associated with gas and crude oil drilling, pumping and production, including but not limited to hydraulic fracturing, as well as other industrial applications, that alleviate several of the problems associated with existing treatments. It is also desirable to provide methods and systems for improved treatment of fracturing fluids.

SUMMARY

In one aspect, the invention relates to a method for treating an aqueous system, comprising providing an aqueous volume having an initial oxidant demand; introducing an oxidant, wherein said oxidant comprises oxygen, air, ozone, or a combination of the same; combining the aqueous volume and oxidant and allowing the oxidant to lower the initial oxidant demand to a reduced oxidant demand; providing at least one chlorine oxide; and combining the aqueous volume and a substoichiometric quantity of at least one chlorine oxide in an amount sufficient to eliminate the reduced oxidant demand, wherein said at least one chlorine oxide comprises chlorine dioxide, chlorite, or a combination of the same and said substoichiometric quantity is less than the reduced oxidant demand in said aqueous volume.

In another aspect, the invention also relates to an aqueous treatment system comprising a containment system comprising an aqueous volume; at least one apparatus for introducing an oxidant into said containment system in controlled quantities and at a controlled flow rate, wherein said oxidant comprises oxygen, air, ozone or combinations thereof and at least one apparatus for introducing at least one chlorine oxide into said containment system at controlled, substoichiometric quantities to achieve a chlorine dioxide residual of at least 0.1 mg/l, wherein said chlorine oxide comprises chlorine dioxide, chlorite, or combinations thereof.

In yet another aspect, the invention also relates to a method for reducing, inactivating, destroying, or eliminating oxidant demand, sulfur compounds, bacteria or a combination thereof from an aqueous fluid volume or stream comprising the steps of introducing a chlorine oxide and an oxidant, wherein the chlorine oxide is added at substoichiometric amounts as compared to a predetermined demand for said chlorine oxide and wherein said oxidant is selected from the group consisting of oxygen, air, oxygen-enriched air, ozone, and combinations thereof and said chlorine oxide is selected from the group consisting of chlorine dioxide, chlorite, and combinations thereof.

The invention further relates to a method for treating an aqueous system, comprising introducing an oxidant into an aqueous volume at a flow rate that avoids off-gassing of volatile reductants from the aqueous volume prior to introducing chlorine dioxide into the volume, wherein said oxidant is selected from the group consisting of oxygen, air, oxygen-enriched air, ozone, and combinations thereof, and wherein the oxidant provides synergistic oxidation activity in the presence of the chlorine dioxide such that the chlorine dioxide is introduced at substoichiometric amounts as compared to a predetermined chlorine dioxide demand.

GLOSSARY

The following terms as used herein have the following meanings:

Demand—The amount of chlorine dioxide (or other oxidant) consumed by background, reactive impurities (both inorganic and organic materials) in a given sample of wastewater (i.e. oilfield water), fracturing fluid, treatment or other target fluids. Chlorine dioxide demand is determined by subtracting the amount of chlorine dioxide remaining after a specified time from the amount of chlorine dioxide initially added to a system.

Free Residual or Residual—The amount of chlorine dioxide (or other oxidant) present at a given time to react with biological species after background contaminants (or "demand") have been converted. In other words, the amount of chlorine dioxide (or other oxidant) available for bacterial control.

Biocide—chemical agent capable of killing living microorganisms, often in a selective way (also referred to as bactericides or antimicrobials).

Biological Contamination—any living microorganism or by-product of a living microorganism found in wastewater (i.e. oilfield water), fracturing fluids, treatment fluids, source water or other target fluids.

Biocidally-Effective Amount—An amount that will control, kill or otherwise reduce the bacterial or microbial content of the wastewater (i.e. oilfield water), fracturing fluids, treatment fluids, source water or other target fluids at issue.

Well Fluid, Fracturing Fluid or Frac Fluid—Any fluid used in any of the drilling, completion, work over and production of subterranean oil and gas wells. It generally includes a source (or raw, or base) water feed (e.g. Frac Water) plus any additives.

Frac Water—Raw water feed used in hydraulic fracturing process from any source, including but not limited to surface water, municipal water or treated flowback or produced water.

Produced Water—Water that is naturally occurring within a subterranean formation that is produced to the surface either as part of a hydraulic fracturing or crude oil operation Flowback Water—Recovered fracturing fluids that flow back to the surface after being pumped down into a subterranean formation as part of a hydraulic fracturing or crude oil operation.

Oilfield Water—As used herein, includes production water, flowback water and other fluids that are the by-products of crude oil production, hydraulic fracturing, or other petroleum production processes.

Furthermore, as used herein, the words "comprise", "has," and "include" and all grammatical variations thereof are each intended to have an open, non-limiting meaning that does not exclude additional elements or parts of an assembly or structural element.

The features of the present invention will be readily apparent to those skilled in the art upon a reading of the description of the embodiments that follows.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated an protected.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

Hydraulic fracturing and other oil field drilling and production processes require large quantities of water and, in turn, produce large quantities of wastewater. Additionally, many other types of industrial or commercial operations rely on large quantities of water and produce large quantities of wastewater, all of which needs to be treated. These industries include, but are not limited to, agriculture, chemical, pharmaceutical, mining, metal plating, textile, brewing, food and beverage processing, and semiconductor industries. The presence of biological contamination and other organic contaminants results in decreased efficiency and can cause damage (i.e. corrosion, blockages, growth of harmful bacteria). Similarly, waters that have high residual organic or biological contamination are unsuitable for use in oilfield operations and need to be treated prior to being injected underground and introduced into a subterranean formation.

In accordance with the embodiments of the invention, chlorine dioxide can be used to treat oilfield water (including production water, flow-back water and surface water) in order to reduce both the biological load and to aid in the breakdown of residual organic contamination in the water. For example, although not limiting, one or more embodiments of the present invention may be used for the treatment of produced or flowback water prior to disposal or reuse. Both produced and flowback water tend to have substantial biological contamination, as well as a high load of organic contaminants (such petroleum hydrocarbons, oil and grease, diesel-related organics, BTEX), polymers (such as polyacrilamides), iron (Fe), transition metals, suspended solids, and other contaminants.

In one or more embodiments of the invention, and by way of example only, the methods disclosed herein can be used to treat produced or flow-back water: 1) before the water is released back into the environment; 2) before the water is used for use in a subsequent hydraulic fracturing operation; 3) as a pretreatment for frac water, including but not limited to a pretreatment "on the fly"; 4) before the water is deposited in storage pits/tanks/lagoons; or 5) as part of a closed-loop oilfield production system.

For example, one embodiment is a process for the disinfection and oxidation of wastewater and contaminated fluids, that provides for a substantial reduction in the amount of chlorine dioxide required to remove oxidant demand and/or eliminate biological contamination, and eventually achieve a final residual of chlorine dioxide in the range of about 0.1 mg/l and 50 mg/l, thus making the wastewater suitable for re-use. In one embodiment, a combination of a chlorine oxide 30 and an oxidant 40 is introduced into a fluid stream 100. Fluid stream 100 comprises wastewater 15, for example, a wastewater fluid stream from a hydraulic fracturing site, or any target fluid. Chlorine oxide 30 comprises chlorine dioxide (30a), chlorite (30b) or a combination thereof, which are introduced into stream 100. For example, chlorine dioxide can be introduced via education using a venturi 20, wherein venturi 20 is part of fluid stream 100 being treated, or other means well known in the art. As used herein, oxidant 40 can be air, oxygen, oxygen-enriched air, ozone, any chemical oxygen source or combination that is stable with chlorine dioxide (30a) and/or chlorite (30b), or some combination of the same. In one or more embodiments of the invention, oxidant 40 is introduced via direct injection into the wastewater in fine bubbles (i.e. air sparging,), a pressurized source 80, an aerator, mechanical agitation, a diffuser, spraying, or education via venturi 20.

For example, a closed loop treatment system 150 is shown. In this embodiment, closed loop treatment system 150 comprises a venturi 20, a fluid stream 100 (e.g. wastewater 15) to be treated, storage vessel 50, chlorine oxide 30 and oxidant 40. In accordance with one embodiment of the invention as applied to the oilfield and fraccing industry, storage 50 contains wastewater 15, which is supplied by a source 10. Source 10 comprises a source of produced water, flowback water, surface water, municipal water, frac water, wastewater, or any combination thereof. One of ordinary skill in the art, however, will recognize that wastewater 15 can be any water or target aqueous fluid that is contaminated (for example, with organics and/or microorganisms) and is being recycled or treated for reuse, storage and/or discharge back into the environment, regardless of industry. In one or more embodiments, the oxidant demand of the contaminants in wastewater 15, prior to treatment, is from about 30 mg/l to about 5000 mg/l, preferably from about 50 mg/l to about 500 mg/l. The oxidant demand comprises reducing agents including, but not limited to, reduced sulfur compounds, biomass and other biological by-products, and reduced metals including but not limited to iron (Fe) II.

In one embodiment, venturi 20 is used to both generate and introduce chlorine oxide 30 (i.e. chlorine dioxide (30a), and/or a combination of chlorine dioxide (30a) and chlorite (30b)) into fluid stream 100 and, additionally, to then introduce oxidant 40. In a preferred embodiment, a drive fluid 33 for venturi 20 comes directly from storage vessel 50. Vessel 50 contains wastewater 15, i.e. the wastewater to be treated, or a combination of treated wastewater (or other target fluid) and the wastewater to be treated. One of ordinary skill in the art will recognize, however, that drive fluid 33 can come from any available water source placed in line with system 150. In accordance with the invention, storage vessel 50 is a tank, pit or pond, or any other storage means (e.g. reservoir, container, or lagoon) that stores, holds, transports or contains wastewater 15 from source 10.

In embodiments of the invention, chlorine oxide 30 and oxidant 40 are applied at such a rate that the removal of volatile reductants (i.e. hydrogen sulfide) is via oxidation, rather than physical purging or stripping. By selecting an air flow rate that prevents or avoids off-gassing of the hydrogen sulfide (or other volatile reductants) present in wastewater 15, the reductants are oxidized in situ rather than purged. The goal is to add oxidant 40 to the fluid at a flow rate that brings it into contact with the sulfides to allow oxidation to occur. Thus, a flow rate that results in the addition of air being violent, and thus stripping the sulfides before they can oxidize, should be avoided. The volume of vessel 50 (or fluid to be treated) will directly affect the range of flow rates that can be used to avoid off-gassing/purging and, thus, the appropriate range is widespread. For example, a small tank would require a much lower air flow rate than a deep pond. However, one of ordinary skill in the art will be able to determine the appropriate flow rate to avoid purging, or stripping, of the volatiles, depending on the volume, depth and/or size of vessel 50 (or fluid to be treated), the treatment system and demand.

In embodiments of the invention, a diffuser 70 is used to introduce oxidant 40. In one or embodiments, oxidant 40 is added directly to wastewater 15 near the bottom of vessel 50 and the resultant mechanical action is thereby used to enhance mixing of wastewater 15 within vessel 50. If a single point introduction method is used, it is preferred that the injector be movable throughout the horizontal plane of vessel 50 (not shown).

In one or more of the embodiments disclosed herein, chlorine oxide 30 and oxidant 40 are introduced into wastewater 15 as follows. Initially, chlorine oxide 30 is introduced for a sufficient amount of time and at a sufficient dosage to reduce the chlorine dioxide demand of the wastewater 15 by about 10 percent to about 20 percent. The amount of time and dosage required will depend on the characteristics of wastewater 15 (e.g. chlorine dioxide demand), the treatment system, and the intended use or application. In this step, chlorine oxide 30 may be chlorine dioxide (30a), chlorite (30b) or a combination thereof. In one or more embodiments, during this initial (or first) stage of treatment, chlorine oxide 30 comprises chlorite (30b) only. In embodiments where chlorine oxide 30 comprises chlorite (30b) only, the step of introducing oxidant 40 (see below) may be (and, in many instances, is preferred to be) performed simultaneously. On the other hand, because chlorine dioxide reacts as a free radical and, therefore, reacts almost instantaneously, chlorine dioxide cannot be added at high rates or concentrations at the same time as when a large volume of oxidant 40 is being added. Therefore, if chlorine oxide 30 comprises chlorine dioxide (30a) during this initial step (or a combination of chlorite (30b) and chlorine dioxide (30a)), oxidant 40 cannot be added at the same time until all of the chlorine dioxide (30a) has converted to chlorite (30b) or, if performed simultaneously, oxidant 40 must be added at a rate low enough to make sure any chlorine dioxide is not stripped, or purged, from wastewater 15 before it disperses through the fluid body.

Furthermore, in certain embodiments, caustic can be added either prior to treatment with chlorine oxide 30, or concurrently therewith, to raise the pH of wastewater 15 to about 7-10. By introducing a higher pH for wastewater 15, contaminant metals (for example, iron (Fe)) will drop out of solution and the formation of certain metal complexes that tend to form in low pH will be avoided. In still other embodiments, the first step of adding chlorine oxide 30 can be skipped, depending on the chlorine dioxide demand and the application/system at hand.

Next, oxidant 40 is introduced into wastewater 15. Oxidant 40 is added at an appropriate dosage and period of time to achieve an overall dosage ranging from about 20 mg/kg to about 2000 mg/kg of oxidant 40 to the total volume of wastewater 15 to be treated, with a more preferred dosage of about 20 mg/kg to about 1000 mg/kg of oxidant 40 to the total volume of fluid to be treated. Again, the amount of time and dosage required will depend on the characteristics of wastewater 15 (e.g. chlorine dioxide demand), the treatment system, and the intended use or application, together with other mechanical considerations known to those of ordinary skill in the art. In one or more embodiments, the application of oxidant 40 consumes, in total, from about 10 percent to about 90 percent of the total chlorine dioxide demand, preferably from about 60 percent to about 90 percent of the chlorine dioxide demand. As discussed above, the step of introducing oxidant 40 can be performed simultaneously with the first step of adding chlorine oxide 30, in particular when chlorine oxide 30 is chlorite (30b) only during the first treatment step.

In the next step, chlorine oxide 30 is introduced at substoichiometric amounts until the target chlorine dioxide residual is reached. In this step, chlorine oxide 30 comprises one or more of chlorine dioxide (30a), chlorite (30b) or a combination thereof, and it does not have to be the same as what was used for chlorine oxide 30 in the initial step. For example, in one preferred embodiment, chlorite (chlorine oxide 30b), oxygen (oxidant 40), and caustic (optional) are introduced simultaneously at the beginning of the treatment process for a period of time (i.e. about 15 to about 60 minutes), followed by substoichiometric quantities of chlorine dioxide (chlorine oxide 30a) until the target residual of chlorine dioxide is reached. The target residual concentration of chlorine dioxide in the treated fluid or wastewater depends on the intended storage period prior to use. For example, for immediate use as frac water in a hydraulic fracturing system, the desired chlorine dioxide residual of fluid 200 is between about 0.1 mg/l and about 20 mg/l, preferably between about 0.5 mg/l and about 5 mg/l. By way of further example, if the treated fluid is to be stored in vessel 50 for several days or more, the target residual concentration of chlorine dioxide should be between about 5 mg/l and about 50 mg/l, preferably between about 20 mg/l and about 50 mg/l. In one or more embodiments, chlorine oxide 30 comprises chlorine dioxide (30a) only during the last stage of the treatment process. During this treatment step, chlorine oxide 30 (in the form of chlorine dioxide (30a)) and oxidant 40 cannot be added to stream 100 at the same time.

In one or more embodiments of the invention, the total treatment time required for wastewater 15 to achieve oxidation and/or disinfection is less than 24 hours, preferably less than 8 hours, if storage (or vessel) 50 is a tank, pit, pond, or lagoon. In still other embodiments, the total treatment time required for wastewater 15 to achieve oxidation and/or disinfection is less than about 60 minutes, and preferably less than about 15 minutes, if vessel 50 is a pipeline, or a combination pipeline and a tank, such as would be used for "on the fly" operations out in the field, when there is a limited residency time and treated fluid 200 is to be used immediately.

In one embodiment, air injection is used to introduce oxidant 40 into vessel 50 via diffuser 70 and a pressurized source 71. In yet another embodiment, a chemical tank 80 is used to introduce oxidant 40. In another embodiment, diffuser 70 and pressurized source 71, placed in-line, are used to introduce oxidant 40 into stream 100. In still other embodiments, treatment system 250 is, for example, a frac-on-the-fly treatment system or any other industrial water treatment system that is placed in-line for immediate use. In one embodiment, oxidant 40 is introduced in-line via venturi 20 from chemical source 72. In another embodiment, a chemical tank 80 is used in-line to introduce oxidant 40 into stream 100. In still another embodiment, air injection is used to introduce oxidant 40 into stream 100 via diffuser 70 and a pressurized source 71.

Any appropriate method of producing chlorine dioxide known in the art may be used to generate chlorine dioxide suitable for use in the present invention. In general, chlorine dioxide solutions can be produced by treatment of chlorite salt solutions (e.g. $NaClO_2$) with an acid solution to produce acidic solutions that contain $ClO_2$, which can be then be flushed as a gas into water to produce aqueous $ClO_2$. Other precursors such as sodium chlorate can also be used.

Several chemical means of generating chlorine dioxide and their corresponding chlorine dioxide precursor chemicals are known in the art, and the choice of suitable means and chemicals is within the abilities of those skilled in the art. Exemplary chemical means of generating chlorine dioxide are disclosed in U.S. Pat. No. 4,689,169 (Mason et al.), U.S. Pat. No. 5,204,081 (Mason et al.), U.S. Pat. No. 5,227,306 (Eltomi et al.), U.S. Pat. No. 5,258,171 (Eltomi et al.), U.S. Pat. No. 5,965,004 (Cowley et al.), and U.S. Pat. No. 6,645,457 (Mason et al.) the disclosures of which are incorporated herein by reference.

In preferred embodiments, the chlorine dioxide should be of the highest possible purity. More specifically, chlorine gas should be present in the introduced chlorine dioxide gas at a level less than about 5%, preferably less than about 0.5%. For example, in a preferred embodiment, the present invention provides a process that comprises producing chlorine dioxide by using an apparatus such as a chlorine dioxide generator, e.g. as disclosed and claimed in U.S. Pat. No. 6,468,479, the disclosure of which is incorporated herein by reference. The chlorine dioxide is generated either directly as a gas, or preferably as an aqueous (or other suitable liquid carrier) chlorine dioxide mixture. The generator is preferably run using an excess of sodium chlorite to reduce the possibility of generating chlorine gas as an impurity. Other generally accepted methods for generating chlorine dioxide can be found in, for example, U.S. Patent Pub. No. 2006/0068029 (U.S. patent application Ser. No. 11/131,021), the disclosure of which is incorporated herein by reference. Furthermore, the generator preferably uses wastewater 15 as the drive fluid for generating chlorine dioxide and brings chlorine dioxide gas into contact with wastewater 15 under a vacuum pressure such that the chlorine dioxide gas is drawn into wastewater 15 to form a chlorine dioxide aqueous solution.

In certain embodiments, the fluid to be treated is circulated through a closed-loop system and treated in situ in accordance with the methods and systems disclosed herein until the contaminants are oxidized and the appropriate residual of chlorine dioxide is established in vessel 50. In still other embodiments, after treatment with chlorine oxide 30 and second oxidant 40, the treated fluids are allowed to stand in vessel 50 for an appropriate period of time to allow the solids to settle and free oil to be skimmed prior to reuse or discharge. In still other embodiments, the fluid treated is used immediately after treatment for subsequent crude oil, hydraulic fracturing, or other industrial applications.

Furthermore, in alternative embodiments of the invention, the system or process disclosed herein may be combined with one or more traditional or nontraditional biocides, either oxidizing or non-oxidizing, to achieve a synergistic biocidal effect. Additionally, in alternative embodiments, one of ordinary skill in the art will readily appreciate that additional treatment processes known in the art can be incorporated in line or elsewhere in the system (either prior to treatment in accordance with this invention, or subsequent thereto) in either batch or continuous operation. By way of example only, and not meant to be limiting, treatment processes to remove oil and/or solids can be incorporated into the system, or if foaming occurs, one might incorporate a chlorine dioxide compatible defoamer. Similarly, in certain embodiments, the method and system disclosed herein can be added to, or retrofitted into, a preexisting recycling or treatment system. One of ordinary skill in the art will also readily appreciate that in one or more embodiments, appropriate measurement and monitoring apparatus and/or equipment may be incorporated into the method and system disclosed herein.

In the embodiments disclosed herein, one of ordinary skill in the art will appreciate that chlorine dioxide residual can be determined and/or calculated using Method 4500-ClO2 E Amperometric Method II described in Standard Methods the Analysis of Water and Wastewater, or via modified versions of the same, wherein Standard Method 4500-ClO2 E Amperometric Method II uses the following calculations:

$$ClO_2 \text{ (mg/L)} = 1.25 \times (B-D) \times 0.00564 \times 13,490/200$$

$$\text{Chlorite (mg/L)} = D \times 0.00564 \times 16,863/200$$

$$\text{Chlorine (mg/L)} = [A-(B-D)/4] \times 0.00564 \times 35,453/200,$$

where Titration A titrates the chlorine and one-fifth of the available chlorine dioxide, Titration B titrates four-fifths of the chlorine dioxide and chlorite, Titration C titrates the non-volatilized chlorine (nitrogen gas purges the sample of the chlorine dioxide), but is not used in any calculation, and Titration D titrates the chlorite. In still other embodiments, chlorine dioxide residual can be determined spectrometrically or by measurement of oxidation reduction potential (ORP), each of which are incorporated herein, or via modified versions of the same.

To facilitate a better understanding of the present invention, the following examples of embodiments in accordance with the invention are given. It should be understood, however, that no limitation of the scope of the invention is intended, and the following examples should not be read to limit or define the scope of the invention.

EXAMPLES

In the following examples, the effect of chlorine dioxide on oilfield wastewater, with and without oxygen treatment, was studied.

Example 1

The following experiment was conducted to determine how significantly the addition of air/oxygen affects chlorine dioxide (and/or chlorite) treatment of a sample of oilfield wastewater. The experimental results demonstrate that the combination of air/oxygen with chlorine dioxide or chlorite has an unexpected, beneficial result of substantially reducing the oxidant dosage required for oxidation of sulfides present in oilfield wastewater. Additionally, the combination of air/oxygen with chlorine dioxide unexpectedly achieves bacterial kill at significantly reduced dosages. In contrast, air/oxygen addition alone is not sufficient over a reasonable period of time to remove sulfides from wastewater or to kill bacteria present therein, and the addition of alternative oxidants (i.e. nitrogen) do not have the same synergistic effect.

For each of experiments 1(A)-1(G) below, a sample of water was used that contains 10 percent solids with 110 mg/l of sulfide in the aqueous phase and has a pH of 8.2. The solids consist of biomass, inorganic material, hydrocarbon, and insoluble sulfides at a concentration of 82.5 mg/kg. Sulfide reducing and general aerobic bacteria were cultured from the sample, demonstrating growth over $10^6$ cfu/ml. The sample (solution and solids) have a black coloration.

First, a series of experimental controls were conducted as follows:

Control A. A 200 ml portion of the sample was treated with 335 mg/l chlorine dioxide over a 15 minute period while stirring to achieve a trace (<1.0 mg/l) residual of chlorine dioxide in solution. The sample quickly turns from a black coloration to a brown/orange with the insoluble solids settling quickly and an iron type floc forming. There was also a slight sheen of hydrocarbon on the surface of the treated sample. No further change in appearance of the treated fluid was observed over 5 minutes. The solids (sludge) and fluid were analyzed for sulfide content using a Garret Gas Train. No detectable sulfides were found in the solids or fluids. Sulfur reducing and general aerobic bacteria were cultured from the sample, demonstrating no bacterial growth.

Control B. A 200 ml portion of the sample was treated with 230 mg/l chlorine dioxide over a five minute period while stirring. The sample quickly turns from a black coloration to a grey brown/orange with the insoluble solids settling quickly and an iron type floc forming. No further change in appearance of the treated fluid was observed over 5 minutes. The solids (sludge) and fluid were analyzed for sulfide content using a Garret Gas Train. There was 31 mg/l and 51 m/kg found in the fluid and sludge, respectively. No chlorine dioxide residual was present. Sulfur reducing and general aerobic bacteria were cultured from the sample, demonstrating bacterial growth over $10^6$ cfu/ml.

Control C. A 200 ml portion of the sample was treated with 420 mg/l of chlorite (560 mg/l as sodium chlorite) while stirring. The sample turns from a black coloration to a brown/orange with the insoluble solids settling and an iron type floc forming over a ten minute period. There was also a slight sheen of hydrocarbon on the surface of the treated sample. No further change in appearance of the treated fluid was observed after 10 minutes. The solids and fluid were analyzed for sulfide content using a Garret Gas Train. No detectable sulfides were found in the fluids, however the solids contain approximately 15 mg/l sulfide. Sulfur reducing and general aerobic bacteria were cultured from the sample, demonstrating growth over $10^6$ cfu/ml.

Control D. A 200 ml portion of the sample was sparged with air through a fine diffuser stone at a rate of 2 SLPM for 30 minutes. Over the 30-min period, the sample turns from a black coloration to a grey coloration. The solids (sludge) and fluid were analyzed for sulfide content using a Garret Gas Train. The fluid contains 60 mg/l sulfide and the solids contain 75 mg/l sulfide. Sulfur reducing and general aerobic bacteria were cultured from the sample, demonstrating growth over $10^6$ cfu/ml.

Sparging experiments were then conducted in three systems (air-chlorine dioxide, nitrogen-chlorine dioxide, and air-chlorite) as follows:

Experiment E. A 200 ml portion of the sample was sparged with air through a fine diffuser stone at a rate of 2 SLPM for four (4) minutes. Initiated concurrently, a dose of 230 mg/l chlorine dioxide was added over a five (5) minute period, with the last minute of dosing being added without air sparging. In this example, ClO2 is added at a low enough rate with a volume and flow rate of air that does not strip the chlorine dioxide before it reacts. The sample quickly turns from a black coloration to a brown/orange with the insoluble solids settling quickly and an iron type floc forming upon the cessation of sparging. No further change in appearance of the treated fluid was observed over five (5) minutes. The solids (sludge) and fluid were analyzed for sulfide content using a Garret Gas Train. There were no detectable sulfides in the solids or fluid. Sulfur reducing and general aerobic bacteria were cultured from the sample, demonstrating no bacterial growth.

Experiment F. A 200 ml portion of the sample was sparged with nitrogen through a fine diffuser stone at a rate of 2 SLPM for four (4) minutes. Initiated concurrently, a dose of 230 mg/l chlorine dioxide was added over a five (5) minute period, with the last minute of dosing being added without nitrogen sparging. The sample quickly turns from a black coloration to a brown/orange with the insoluble solids settling quickly and an iron type floc forming upon the cessation of sparging. No further change in appearance of the treated fluid was observed over 5 minutes. The solids (sludge) and fluid were analyzed for sulfide content using a Garret Gas Train. There were 7 mg/l and 160 mg/l sulfides remaining in the fluid and the solids, respectively. Sulfur reducing and general aerobic bacteria were cultured from the sample, demonstrating over $10^6$ bacterial growth.

Experiment G. A 200 ml portion of the sample was sparged with air through a fine diffuser stone at a rate of 2 SLPM for 15 minutes. Initiated concurrently, a dose of 300 mg/l of chlorite (402 mg/l as sodium chlorite) was added over a five (5) minute period. The sample turns from a black coloration to a brown/orange with the insoluble solids settling quickly and an iron type floc forming upon the cessation of sparging. No further change in appearance of the treated fluid was observed over 15 minutes. The solids (sludge) and fluid were analyzed for sulfide content using a Garret Gas Train. There were no detectable sulfides in the solids or fluid. Sulfur reducing and general aerobic bacteria were cultured from the sample, demonstrating bacterial growth over $10^6$ cfu/ml.

In the following examples, the unexpected, synergistic effect of treating a storage tank with oilfield wastewater with a treatment of chlorine dioxide and oxygen in a closed loop system was studied. Sparging experiments were conducted on two systems (air-chlorine dioxide only, and air-chlorite-chlorine dioxide) as follows:

Example 2

A tank containing about 30,000 barrels (bbl) of produced fresh and flow back water was analyzed and found to contain 16,000 mg/l TDS, over $10^6$ cfu/ml bacteria, and 40 mg/l sulfides in the homogenized fluid at a pH of 7.8. The chlorine dioxide demand of the fluid to be treated was determined to be 180 mg/l. The amount of 50% sodium hydroxide required to maintain the pH was determined to be 630 gallons.

The tank was rigged to a chlorine dioxide generator (see, e.g. U.S. Pat. No. 6,468,479). Although not limiting, one example of generator would be a Sabre BB series portable DiKlor® generation system with a maximum capacity of 24,000 lbs. per day continuous production. This system is self-contained and has a distribution system that allows it to circulate fluids in the tank. More specifically, a drive fluid stream was withdrawn from the tank and circulated through a chlorine dioxide generator by means of a centrifugal pump at a rate of 320 gallons per minute. The generator is arranged so that the suction for the drive fluid stream is pulled from the lowest end of the tank, and the discharge solution containing chlorine dioxide and/or air was returned to the tank and discharge to the bottom of the tank via a movable injection boom. The injection boom was continuously moved around the tank at a rate of 50 feet per minute.

Sodium hydroxide was added to the tank with enough sodium chlorite to absorb approximately 10 percent of the theoretical chlorine dioxide demand. In this specific example, and in accordance with calculations readily known in the art, the amount of sodium chlorite required to absorb 10% of the chlorine dioxide demand was a dosage of approximately 23 mg/l chlorite. The sodium hydroxide and chlorite were added over a sixty minute period with air at a rate of 125 SCFM. In this embodiment, air was introduced via a venturi. At the end of the 60-minute period, the injection of air is discontinued, and chlorine dioxide demand was retested and found to be 27 mg/l. Chlorine dioxide then was introduced via a venturi at an appropriate rate to achieve a dosage of 47 mg/l over a 30 minute period. No air was introduced during the chlorine dioxide step.

The resulting fluid was clear with orange/brown sediment and had a thin layer of floc on top that was determined to be 98% inorganic material and 2% hydrocarbons. 8 mg/l chlorine dioxide was found as a residual in the fluid. The fluid, sludge, and floc were analyzed by garret gas train and determined to contain no sulfides. No bacterial growth was found by culture analysis. The fluid was analyzed to determine suitability for "gelling" for fracturing use. The fluid gelled and cross linked without difficulty. This method resulted in a 75% reduction in the amount of chlorine dioxide required to achieve the target chlorine dioxide residual and no bacterial grown.

Example 3

A tank containing about 30,000 bbl of produced fresh and flow back water was analyzed and found to contain 16,000 mg/l TDS, over $10^6$ cfu/ml bacteria, and 40 mg/l sulfides in the homogenized fluid at a pH of 7.8. The chlorine dioxide demand of the fluid was determined to be 180 mg/l. The tank was rigged to a chlorine dioxide generator where the suction for a drive fluid stream is pulled from the lowest end of the tank, and the discharge solution containing chlorine dioxide and/or air was returned to the tank and discharge to the bottom of the tank via a movable injection boom. The injection boom was continuously moved around the tank at a rate of 50 feet per minute. The fluid was withdrawn from the tank and circulated through the chlorine dioxide generator by means of a centrifugal pump at a rate of 320 gallons per minute.

In this example, chlorite was not added directly to the system as sodium chlorite. Instead, chlorine dioxide was added to the tank initially (which converted to chlorite), followed by air and then a second dosage of chlorine dioxide as set forth below. More specifically, 1) from time zero (0) and over the first 10 minutes, chlorine dioxide was added to provide 20% of the total dosage; 2) from minute 10 through minute 30, the solution was circulated; 3) from minute 30 to minute 60, air was added; and 3) from minute 60 through minute 80, the remaining 80% of the chlorine dioxide was introduced into the tank. In total, the tank was treated with 110 mg/l chlorine dioxide over an aggregate (but, nonconsecutive) 50-minute period. In regards to step 2, one of ordinary skill in the art will recognize that, when a big tank is used, one has to be careful not to get localized "hot spots" and allow the chlorine dioxide to disperse a bit.

In step 3, air was added in isolation through a venturi at a rate of 100 SCFM to tank 250 from minute 30 to minute 60. In alternate embodiments, one could add low dosages of ClO2 with air, depending on the size and depth of the vessel, as well as the flow rate. Sodium hydroxide was added concurrently to maintain stable pH. The fluid was analyzed post treatment. The resulting fluid was clear with orange/brown sediment and had a thin layer of floc on top that was determined to be 98% inorganic material and 2% hydrocarbons. 12 mg/l chlorine dioxide was found as a residual in the fluid. The fluid, sludge, and floc were analyzed by garret gas train and determined to contain no sulfides. No bacterial growth was found by culture analysis. The fluid was analyzed to determine suitability for "gelling" for fracturing use. The fluid gelled and cross linked without difficulty. This method resulted in about a 40% reduction in the amount of chlorine dioxide required to achieve a target chlorine dioxide residual and no bacterial grown.

Example 4

A tank contained 4200 gallons of produced water. The homogenized fluid was analyzed and found to contain 23,000 mg/l TDS, over 104 cfu/ml bacteria, and 175 mg/l sulfides with a pH of 7.8. The chlorine dioxide demand of the fluid was determined to be 580 mg/l. The tank was rigged to a chlorine dioxide generator where the suction for the drive fluid stream is pulled from the lowest end of the tank, and the discharge solution containing chlorine dioxide and/or air via a perforated pipe along the length of the bottom of the tank. The fluid is withdrawn from the tank and circulated through the chlorine dioxide generator by means of a centrifugal pump at a rate of 320 gallons per minute.

As in Example 3, chlorine dioxide was added to the tank initially via a venturi 320, followed by air and then a second dosage of chlorine dioxide as set forth below. More specifically, 1) from time zero (0) and over the first minute, chlorine dioxide was added to provide 20% of the total dosage; and then 2) from minute six (6) through minute ten (10), the remaining 80% of the chlorine dioxide was introduced into the tank. In total, the tank was treated with 310 mg/l chlorine dioxide over an aggregate (but, nonconsecutive) 5-minute period. Air was added through a venturi at a rate of 50 SCFM to the tank from minute one (1) to minute six (6). Sodium hydroxide was added concurrently to maintain stable pH. The fluid was analyzed post treatment. The fluid was clear with orange/brown sediment and had a thin layer of floc on top that was determined to be 96% inorganic material and 4% hydrocarbons. 7 mg/l chlorine dioxide was found as a residual in the fluid. The fluid, sludge, and floc were analyzed by garret gas train and determined to contain no sulfides. No bacterial growth was found by culture analysis. This method resulted in about a 47% reduction in the amount of chlorine dioxide required to achieve a target chlorine dioxide residual and no bacterial grown.

Example 5

A tank contained 4200 gallons of produced water. The homogenized fluid was analyzed and found to contain 23,000 mg/l TDS, over 104 cfu/ml bacteria, and 175 mg/l sulfides with a pH of 7.8. The chlorine dioxide demand of the fluid was determined to be 580 mg/l. The tank was rigged to a chlorine dioxide generator where the suction for the drive fluid stream is pulled from the lowest end of the tank, and the discharge solution containing chlorine dioxide and/or air via a perforated pipe along the length of the bottom of the tank. The fluid is withdrawn from the tank and circulated through the chlorine dioxide generator by means of a centrifugal pump at a rate of 320 gallons per minute.

In this example, chlorite was introduced directly at a rate to achieve a dosage of 120 mg/l over the first minute. Chlorine dioxide also was added at a rate to achieve a dosage of 210 mg/l over an aggregate five (5) minute period. Specifically, chlorine dioxide was added from time zero (0) to minute one (1), and then again from minute six (6) to minute ten (10). Air was added through a venturi at a rate of 50 SCFM to the tank from minute zero to minute nine. Sodium hydroxide was added concurrently to maintain stable pH. The fluid was analyzed post treatment.

The treated fluid was clear with orange/brown sediment and had a thin layer of floc on top that was determined to be 96% inorganic material and 4% hydrocarbons. 7 mg/l chlorine dioxide was found as a residual in the fluid. The fluid, sludge, and floc were analyzed by garret gas train and determined to contain no sulfides. No bacterial growth was found by culture analysis. This method resulted in about a 43% reduction in the amount of chlorine oxides required to achieve a target chlorine dioxide residual and no bacterial grown.

Although the Examples and descriptions above discuss what is, in essence, a closed loop treatment system, the systems and methods disclosed herein and claimed could also be utilized for a frac "on the fly" system and method, wherein the treated water would be used immediately and/or shortly after being treated for fracturing. For example, in one embodiment, the frac water to be injected into the subterranean formation would be treated using the methods disclosed herein out in the oilfield, ahead of the well head. For this system, you would continuously be filling a vessel (e.g. onsite frac tanks, located at the frac site/oilfield) with source water that needs to be treated prior to introduction into the well. The water could comprise surface water, municipal water, produced water, flow back water, or any combination of the above ("commingled water").

While the preferred application for the method and system disclosed herein is in the oil field applications, such as petroleum wells, downhole formations, and industrial and petroleum process water, additional industrial applications include, but are not limited to, cooling water systems, mineral process waters, geothermal wells, paper mill digesters, washers, bleach plants, stock chests, and white water systems, black liquor evaporators in the pulp industry, continuous casting processes in the metallurgical industry, air conditioning and refrigeration systems, water reclamation systems, water purification systems, membrane filtration systems, food processing streams (meat, vegetable, sugar cane, poultry, fruit and soybean); and waste treatment systems as well as clarifiers, municipal sewage treatment, municipal water systems, potable water systems, aquifers, and water tanks.

Various embodiments and modifications of this invention have been described in the foregoing description. Such embodiments and modifications are illustrative only and are not to be taken as limiting in any way the scope of the invention, which is defined by the following claims. Other variations of what has been described also fall within the scope of the invention, and the present invention may be modified and practices in different but equivalent manners apparent to those skilled in the art having the benefit of the teachings herein. Furthermore, no limitations are intended to the details of construction or design herein shown, other than as described in the claims below. All numbers and ranges disclosed above may vary by some amount. Also, the terms in the claims shall have their plain, ordinary meaning unless otherwise explicitly and clearly defined by the patentee. Subject matter incorporated by reference is not considered to be an alternative to any claim limitations, unless otherwise explicitly indicated.

The invention claimed is:

1. A method for reducing, inactivating, destroying, removing, or eliminating from an aqueous fluid one or more contaminants selected from the group consisting of sulfur compounds, bacteria and combinations thereof, the method comprising the steps of
   (i) introducing an oxidant into the aqueous fluid at a flow rate that avoids off-gassing of volatile reductants from the aqueous fluid,
   (ii) introducing a first chlorine oxide comprising sodium chlorite into the aqueous fluid either prior to or contemporaneous with the step of introducing the oxidant, and
   (iii) introducing a second chlorine oxide comprising chlorine dioxide into the aqueous fluid after introducing the first chlorine oxide and oxidant,
wherein said oxidant is selected from the group consisting of oxygen ($O_2$), air, oxygen ($O_2$)-enriched air, and combinations thereof, and is substantially ozone-free.

2. The method of claim 1 further comprising introduction of sodium hydroxide into the aqueous fluid to maintain stable pH.

3. The method of claim 1 wherein the second chlorine oxide is an aqueous chlorine dioxide solution.

4. The method of claim 3 further comprising the step of generating the chlorine dioxide aqueous solution by using a portion of the aqueous fluid to be treated.

5. The method of claim 3, wherein the aqueous solution of chlorine dioxide is produced by flushing chlorine dioxide gas into water, wherein chlorine gas is present in the flushed gas at a level less than 5%.

6. The method of claim 5, wherein chlorine gas is present in the flushed gas at a level less than 0.5%.

7. The method of claim 1, wherein the residual concentration of chlorine dioxide in the aqueous fluid after treatment is in the range of about 0.1 mg/l to about 50 mg/l.

8. The method of claim 1 wherein the source of the aqueous fluid is an aqueous fluid stream; a vessel, tank, pit, lagoon, or pond for storing waste water; a water treatment plant; a hydraulic fracturing tank; or a piece of equipment, pipeline or vessel used for hydraulic fracturing or crude oil production.

9. The method of claim 1, wherein the residual concentration of chlorine dioxide in the aqueous fluid after treatment is at least 0.1 mg/l.

10. The method of claim 9, further comprising measuring the residual concentration of chlorine dioxide in the aqueous fluid after treatment.

11. The method of claim 1, wherein the method reduces the total amount of chlorine oxide required to achieve a target residual concentration of chlorine dioxide in the aqueous fluid.

12. The method of claim 1, wherein the chlorine dioxide demand of the aqueous fluid is reduced by at least 10% prior to introducing the second chlorine oxide into the aqueous fluid.

13. The method of claim 1, wherein introducing the oxidant and the first chlorine oxide reduces by at least 40% the total amount of chlorine dioxide required to achieve a target residual concentration of chlorine dioxide in the aqueous fluid, wherein the target residual concentration of chlorine dioxide is at least 0.1 mg/ml.

14. The method of claim 13, wherein the target residual concentration of chlorine dioxide is 0.1 mg/l to about 50 mg/l.

15. The method of claim 13, wherein the oxidant is introduced by air sparging, a pressurized source, an aerator, mechanical agitation, a diffuser, spraying, or eduction via a venturi.

16. A method for reducing, inactivating, destroying, removing, or eliminating from an aqueous fluid one or more contaminants selected from the group consisting of sulfur compounds, bacteria and combinations thereof, the method comprising the steps of
   (i) introducing an oxidant into the aqueous fluid at a flow rate that avoids off-gassing of volatile reductants from the aqueous fluid, wherein said oxidant is selected from the group consisting of oxygen ($O_2$), air, oxygen ($O_2$)-enriched air, and combinations thereof and is substantially ozone-free;
   (ii) introducing a first chlorine oxide into the aqueous fluid either prior to or contemporaneous with the step of introducing the oxidant, wherein said first chlorine oxide is selected from the group consisting of chlorine dioxide, chlorite, and combinations thereof; and
   (iii) introducing a second chlorine oxide into the aqueous fluid after introducing the oxidant and the first chlorine oxide, wherein the second chlorine oxide is chlorine dioxide,
   wherein the chlorine dioxide demand of the aqueous fluid is reduced by at least 10% prior to introducing the second chlorine oxide into the aqueous fluid.

17. The method of claim 16, wherein the oxidant is introduced by air sparging, a pressurized source, an aerator, mechanical agitation, a diffuser, spraying, or eduction via a venturi.

18. The method of claim 16, wherein introducing the oxidant and the first chlorine oxide reduces the total amount of chlorine oxide required to achieve a target residual concentration of chlorine dioxide in the aqueous fluid.

19. The method of claim 16, wherein introducing the oxidant and the first chlorine oxide reduces by at least 40% the total amount of chlorine dioxide required to achieve a target residual concentration of chlorine dioxide in the aqueous fluid, wherein the target residual concentration of chlorine dioxide is at least 0.1 mg/ml.

20. The method of claim 19, wherein the target residual concentration of chlorine dioxide is 0.1 mg/l to about 50 mg/l.

21. The method of claim 16, wherein sodium hydroxide is introduced into the aqueous fluid prior to the step of introducing the oxidant, either in combination with the first chlorine oxide or as a separate feed substantially contemporaneously therewith.

22. The method of claim 16, wherein the aqueous fluid has a chlorine dioxide demand of about 30 mg/l to about 5000 mg/l prior to treatment.

23. A method for reducing, inactivating, destroying, removing, or eliminating from an aqueous fluid one or more contaminants selected from the group consisting of sulfur compounds, bacteria and combinations thereof, the method comprising the steps of
(i) introducing an oxidant into the aqueous fluid at a flow rate that avoids off-gassing of volatile reductants from the aqueous fluid, wherein said oxidant is selected from the group consisting of oxygen ($O_2$), air, oxygen ($O_2$)-enriched air, and combinations thereof and is substantially ozone-free;
(ii) introducing a first chlorine oxide into the aqueous fluid either prior to or contemporaneous with the step of introducing the oxidant, wherein said first chlorine oxide is selected from the group consisting of chlorine dioxide, chlorite, and combinations thereof; and
(iii) introducing a second chlorine oxide into the aqueous fluid after introducing the oxidant and the first chlorine oxide to achieve a target residual concentration of chlorine dioxide in the range of about 0.1 mg/ml to about 50 mg/l in the aqueous fluid, wherein the second chlorine oxide is chlorine dioxide,
wherein the introduction of the oxidant and the first chlorine oxide reduces by at least 40% the total amount of chlorine dioxide required to achieve the target residual concentration of chlorine dioxide.

24. The method of claim 23, wherein the aqueous fluid has a chlorine dioxide demand of about 30 mg/l to about 5000 mg/l prior to treatment.

25. The method of claim 23, wherein the chlorine dioxide demand of the aqueous fluid is reduced by at least 10% prior to introducing the second chlorine oxide into the aqueous fluid.

26. The method of claim 23, wherein the oxidant is introduced by eduction via a venturi.

* * * * *